US011223892B2

(12) United States Patent
Li

(10) Patent No.: US 11,223,892 B2
(45) Date of Patent: Jan. 11, 2022

(54) HEADSET CHARGING AND DATA TRANSMISSION SYSTEM

(71) Applicant: MERRY ELECTRONICS (SHENZHEN) CO., LTD., Guangdong (CN)

(72) Inventor: Hung-Yuan Li, Taichung (TW)

(73) Assignee: MERRY ELECTRONICS (SHENZHEN) CO., LTD., Guangdong (CN)

(*) Notice: Subject to any disclaimer, the term of this patent is extended or adjusted under 35 U.S.C. 154(b) by 45 days.

(21) Appl. No.: 16/940,404

(22) Filed: Jul. 28, 2020

(65) Prior Publication Data

US 2021/0329362 A1    Oct. 21, 2021

(30) Foreign Application Priority Data

Apr. 21, 2020 (TW) .................................. 109113385

(51) Int. Cl.
*H04R 1/10* (2006.01)
*H02J 7/00* (2006.01)

(52) U.S. Cl.
CPC ........ *H04R 1/1025* (2013.01); *H02J 7/00032* (2020.01); *H02J 7/00711* (2020.01); *H04R 1/1041* (2013.01)

(58) Field of Classification Search
CPC . H04R 1/1025; H04R 1/1041; H02J 7/00032; H02J 7/00711
See application file for complete search history.

(56) References Cited

U.S. PATENT DOCUMENTS

2019/0201245 A1*   7/2019   Albean ................ H04R 1/1025
2021/0160955 A1*   5/2021   Zhong ................. H04R 1/1041

\* cited by examiner

*Primary Examiner* — Jason R Kurr
(74) *Attorney, Agent, or Firm* — CKC & Partners Co., LLC

(57) ABSTRACT

The present disclosure provides a headset charging and data transmission system, which includes a headset and a charging device. The charging device includes a first controller, a first connector, a first pulse-to-sine wave converter, a first switching device, and a second switching device. The first pulse-to-sine wave converter provides a first sine wave signal and a second sine wave signal. The first controller controls the second switching device to switch between the first and second sine wave signals to provide first sine wave data to the first switching device, and first controller controls the first switching device load a predetermined voltage with the first sine wave data, so as to output a first sine wave data voltage to the headset.

10 Claims, 4 Drawing Sheets

HEADSET CHARGING AND DATA TRANSMISSION SYSTEM

RELATED APPLICATIONS

This application claims priority to Taiwan Patent Application No. 109113385, filed Apr. 21, 2020, the entirety of which is herein incorporated by reference.

BACKGROUND

Field of Invention

The present invention relates to systems, and more particularly, headset charging and data transmission systems.

Description of Related Art

The traditional headset requires charging circuits and data transmission circuits respectively. However, the respective charging circuits and the respective data transmission circuits cause the headset to be bulky and have many contacts.

In view of above, there is an urgent need in the related field to reduce circuits.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

In one or more various aspects, the present disclosure is directed to charging and data transmission systems, to solve or circumvent aforesaid problems and disadvantages in the related art.

An embodiment of the present disclosure is related to a charging and data transmission system. The charging and data transmission system includes a headset and a charging device. The charging device includes a first controller, a first connector, a first pulse-to-sine wave converter, a first switching device and a second switching device. The first connector is configured to connect the headset. The first pulse-to-sine wave converter is electrically connected to the first controller, and the first pulse-to-sine wave converter is configured to provide a first sine-wave signal and a second sine-wave signal. The first switching device is electrically connected to the first controller and the first connector, the first switching device has a first sending terminal, a first receiving terminal and a first transmission terminal, the first transmission terminal is electrically connected to the first connector, and the first transmission terminal is electrically connected to the first sending terminal or the first receiving terminal selectively. The second switching device is electrically connected to the first controller and the first switching device, the second switching device has a first input terminal, a second input terminal and a first output terminal, the first output terminal is electrically connected to the first sending terminal, the first input terminal is configured to receive the first sine-wave signal, the second input terminal is configured to receive the second sine-wave signal, the first controller is based on a first data to control the second switching device to electrically connect the first output terminal to the first input terminal or the second input terminal alternately, so that the first output terminal can provide a first sine-wave data for the first sending terminal, and the first controller is configured to control the first switching device to electrically connect the first sending terminal to the first transmission terminal, so that a predetermined voltage of the first transmission terminal can be loaded with the first sine-wave data to output a first sine wave data voltage to the headset.

In one embodiment of the present disclosure, the first controller controls the first switching device electrically connects the first receiving terminal to the first transmission terminal, so that the first receiving terminal receives a second sine-wave data voltage that is sent from the headset to the first connector. The charging device further includes a first receiver. The first receiver is electrically connected to the first receiving terminal and the first controller, and the first receiver is configured to convert the second sine-wave data voltage into a second digital signal associated with the second data and to output the second digital signal to the first controller.

In one embodiment of the present disclosure, the headset includes a second controller, a second connector, a second pulse-to-sine wave converter, a third switching device and a fourth switching device. The second connector is configured to connect the first connector. The second pulse-to-sine wave converter is electrically connected to the second controller, and the second pulse-to-sine wave converter is configured to provide a third sine-wave signal and a fourth sine-wave signal. The third switching device is electrically connected to the second controller and the second connector, the third switching device has a second sending terminal, a second receiving terminal and a second transmission terminal, and the second transmission terminal is electrically connected to the second connector. The fourth switching device is electrically connected to the second controller and the third switching device, the fourth switching device has a third input terminal, a fourth input terminal and a second output terminal, the second output terminal is electrically connected to the second sending terminal, the third input terminal is configured to receive the third sine-wave signal, the fourth input terminal is configured to receive the second sine-wave signal, the second controller is based on a second data to control the fourth switching device to electrically connect the second output terminal to the third input terminal or the fourth input terminal alternately, so that the second output terminal can provide a second sine-wave data for the second sending terminal, and the second controller is configured to control the third switching device to electrically connect the second sending terminal to the second transmission terminal, so that the second sine-wave data can be outputted to the charging device.

In one embodiment of the present disclosure, the second controller controls the third switching device to electrically connect the second receiving terminal to the second transmission terminal, so that the second receiving terminal can receive the first sine-wave data that are sent from the charging device to the second connector. The headset further includes a second receiver. The second receiver is electrically connected to the second receiving terminal and the second controller, and the second receiver is configured to convert the first sine-wave data into a first digital signal associated with the first data and to output the first digital signal to the second controller.

In one embodiment of the present disclosure, the first pulse-to-sine wave converter includes a first sine-wave generator and a second sine-wave generator. The first sine-wave generator is configured to receive a first pulse wave signal from the first controller and to generate the first sine-wave signal based on the first pulse wave signal. The second sine-wave generator is configured to receive a second pulse wave signal from the first controller and to generate the second sine-wave signal based on the second pulse wave signal.

In one embodiment of the present disclosure, the charging device further includes a voltage supplying circuit. The voltage supplying circuit is configured to provide the predetermined voltage, so that the predetermined voltage can be loaded with the first sine-wave data, so as to output the first sine wave data voltage.

In one embodiment of the present disclosure, a form of the first pulse wave signal is different from a form of the second pulse wave signal, so that a phase of the first sine-wave signal is different from a phase of the second sine-wave signal. The second receiver further includes an amplifier and a phase detector. The amplifier is configured to amplify the first sine wave data voltage. The phase detector is electrically connected to the amplifier, and the phase detector is configured to detect the phase of the first sine wave data voltage that has been amplified, so as to provide the first digital signal associated with the first data.

In one embodiment of the present disclosure, the phase detector includes a first voltage divider circuit, a first transistor, a first resistor, a second voltage divider circuit, a second transistor and a second resistor. The first voltage divider circuit is electrically connected to an output terminal of the amplifier. The first transistor has a base electrically connected to the first voltage divider circuit. The first resistor has one end electrically connected to a collector of the first transistor, and another end electrically coupled with an operating voltage. The second voltage divider circuit is electrically connected to the output terminal of the amplifier. The second transistor has a base electrically connected to the second voltage divider circuit. The second resistor has one end electrically connected to the collector of the second transistor, and another end electrically coupled with the operating voltage. A voltage drop ratio of the first voltage divider circuit is different from a voltage drop ratio of the second voltage divider circuit.

In one embodiment of the present disclosure, a height of the first pulse wave signal is different from a height of the second pulse wave signal, so that an amplitude of the first sine-wave signal is different from an amplitude of the second sine-wave signal. The second receiver further includes an amplifier and an amplitude detection circuit. The amplifier is configured to amplify the first sine wave data voltage. The amplitude detection circuit is electrically connected to the amplifier, and the amplitude detection circuit is configured to detect the amplitude of the first sine wave data voltage that has been amplified, so as to provide the first digital signal associated with the first data.

In one embodiment of the present disclosure, the amplitude detection circuit includes a first comparator and a second comparator. The first comparator has one input terminal electrically connected to an output terminal of the amplifier, and another input terminal electrically coupled with a first reference voltage. The second comparator has one input terminal electrically connected to the output terminal of the amplifier, and another input terminal electrically coupled with a second reference voltage. The first reference voltage is different from the second reference voltage.

Technical advantages are generally achieved, by embodiments of the present disclosure. With the technical solution of the present disclosure, the data transmission is realized on the power rail without additional data transmission lines and contacts, thereby effectively reducing the volume of the headset, and simultaneously transmitting data during the charging process.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
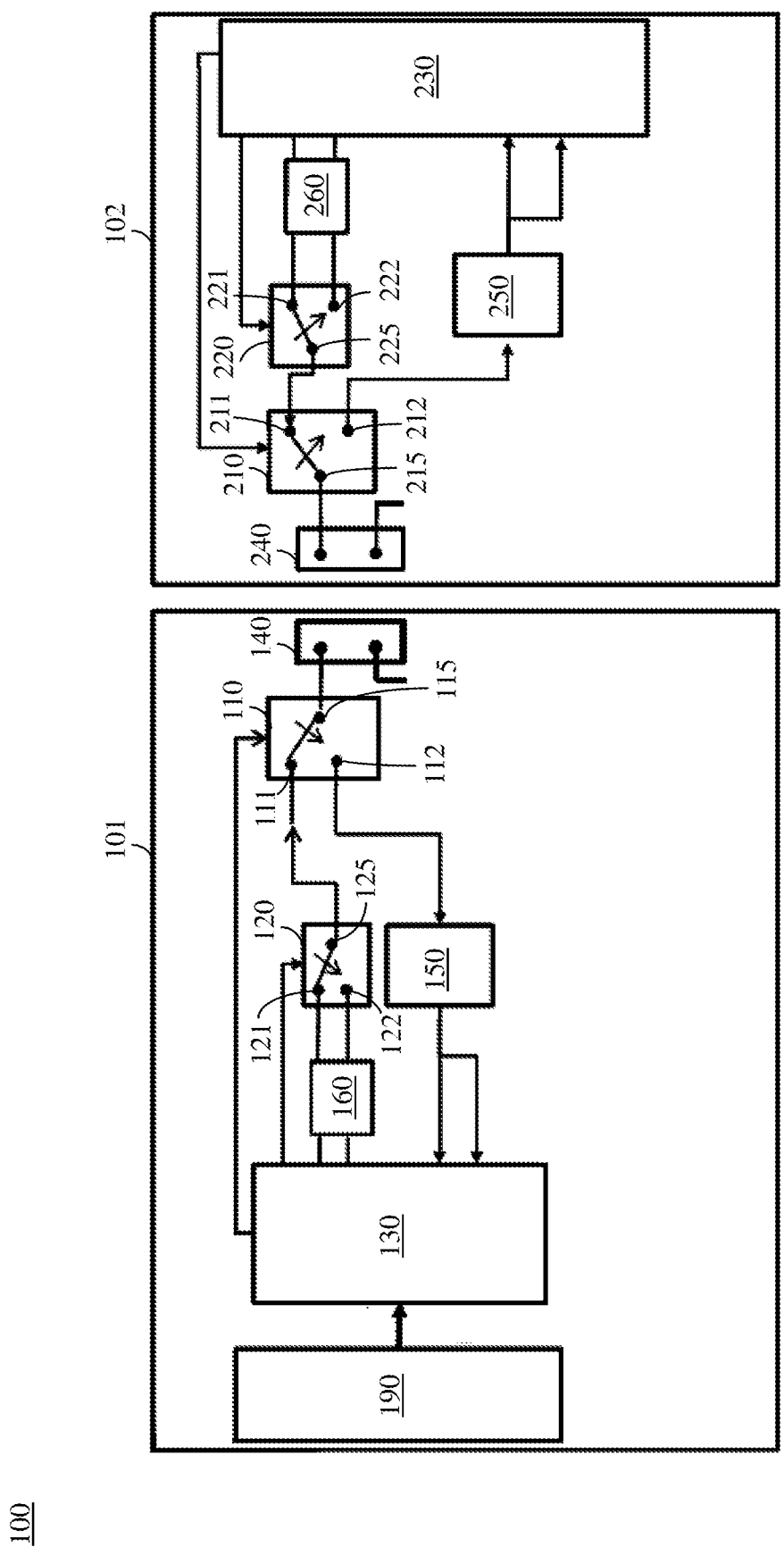
FIG. 1 is a block diagram of a charging and data transmission system according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a charging and data transmission system 100 according to one embodiment of the present disclosure. As shown in FIG. 1, the headset charging and data transmission system 100 includes a headset 102 and a charging device 101. For example, the headset 102 may be a wireless headset. When the headset 102 is connected to the charging device 101, the charging device 101 charges the headset 102 and simultaneously transmits data during the charging process.

In one embodiment of the present disclosure, the charging device 101 at least includes a first controller 130, a first connector 140, a first pulse-to-sine wave converter 160, a first switching device 110 and a second switching device 120. In use, the first connector 140 is configured to connect the headset 102.

In FIG. 1, the first controller 130 is electrically connected to the joint 190, the first pulse-to-sine wave converter 160 is electrically connected to the first controller 130, and the first switching device 110 is electrically connected to the first controller 130 and the first connector 140. In structure, the first switching device 110 has a first sending terminal 111, a first receiving terminal 112 and a first transmission terminal 115, and the first transmission terminal 115 is electrically connected to the first connector 140. Through the control of the first controller 130, the first transmission terminal 115 can be electrically connected to the first sending terminal 111 or the first receiving terminal 112 selectively.

In FIG. 1, the second switching device 120 is electrically connected to the first controller 130 and the first switching device 110. In structure, the second switching device 120 has a first input terminal 121, a second input terminal 122 and a first output terminal 125. The first output terminal 125 is electrically connected to the first sending terminal 111.

In use, the joint 190 can receive an external voltage (e.g., a first volt), and the first pulse-to-sine wave converter 160 is configured to provide the first sine-wave signal and the second sine-wave signal. The first input terminal 121 receives the first sine-wave signal, and the second input terminal 122 receives the second sine-wave signal. The first controller 130 is based on first data (e.g., instructions, exchange information, etc.) to control the second switching device 120 to electrically connect the first output terminal 125 to the first input terminal 121 or the second input terminal 122 alternately, so that the first output terminal 125 can provide the first sine-wave data for the first sending terminal 111. The first controller 130 controls the first switching device 110 to electrically connect the first sending terminal 111 to the first transmission terminal 115, so that a predetermined voltage of the first transmission terminal 115 can be loaded with the first sine-wave data to output a first sine wave data voltage to the headset 102. Thus, the charging device 101 can charge the headset 102 and simultaneously transmit data to the headset 102 during the charging process.

When the headset 102 transmits data to the charging device 101, the first controller 130 controls the first switching device 110 to electrically connect the first receiving terminal 112 to the first transmission terminal 115, so that the first receiving terminal 112 can receive a second sine-wave data voltage that is sent from the headset 102 to the first connector 140.

In one embodiment of the present disclosure, the charging device 101 can include a first receiver 150. In structure, the first receiver 150 is electrically connected to the first receiving terminal 112 and the first controller 130. In use, the first receiver 150 is configured to convert the second sine-wave data voltage into a second digital signal associated with the second data and to output the second digital signal to the first controller 130, so as to facilitate the first controller 130 for data reading.

In FIG. 1, the headset 102 includes a second controller 230, a second connector 240, a second pulse-to-sine wave converter 260, a third switching device 210 and a fourth switching device 220. In use, the second connector 240 is configured to connect the first connector 140.

In FIG. 1, the second pulse-to-sine wave converter 260 is electrically connected to the second controller 230, and the third switching device 210 is electrically connected to the second controller 230 and the second connector 240. In structure, the third switching device 210 has a second sending terminal 211, a second receiving terminal 212 and a second transmission terminal 215. The second transmission terminal 215 is electrically connected to the second connector 240.

In FIG. 1, the fourth switching device 220 is electrically connected to the second controller 230 and the third switching device 210. In structure, the fourth switching device 220 has a third input terminal 221, a fourth input terminal 222 and a second output terminal 225. The second output terminal 225 is electrically connected to the first sending terminal 211.

In use, the second pulse-to-sine wave converter 260 is configured to provide the third sine-wave signal and the fourth sine-wave signal. The third input terminal 221 receives the third sine-wave signal, and the fourth input terminal 222 receives the second sine-wave signal. The second controller 230 is based on the second data (e.g., instructions, exchange information, etc.) to control the fourth switching device 220 to electrically connect the second output terminal 225 to the third input terminal 221 or the fourth input terminal 222 alternately, so that the second output terminal 225 can provide the second sine-wave data for the second sending terminal 211. The second controller 230 controls the third switching device 210 to electrically connect the second sending terminal 211 to the second transmission terminal 215, so that the second sine-wave data can be outputted to the charging device 101.

When the charging device 101 transmits data to the headset 102, the second controller 230 controls the third switching device 210 to electrically connect the second receiving terminal 212 to the second transmission terminal 215, so that the second receiving terminal 212 can receive the first sine-wave data that are sent from the charging device 101 to the second connector 240.

In one embodiment of the present disclosure, the headset 102 further includes a second receiver 250. In structure, the second receiver 250 is electrically connected to the second receiving terminal 212 and the second controller 230. In use, the second receiver 250 is configured to convert the first sine-wave data into a first digital signal associated with the first data and to output the first digital signal to the second controller 230, so as to facilitate the second controller 230 for data reading.

In practice, the signals of the first and second data may include a checksum or codes of cyclic redundancy check (CRC) to allow the receiver to confirm the data integrity.

Figure 2:
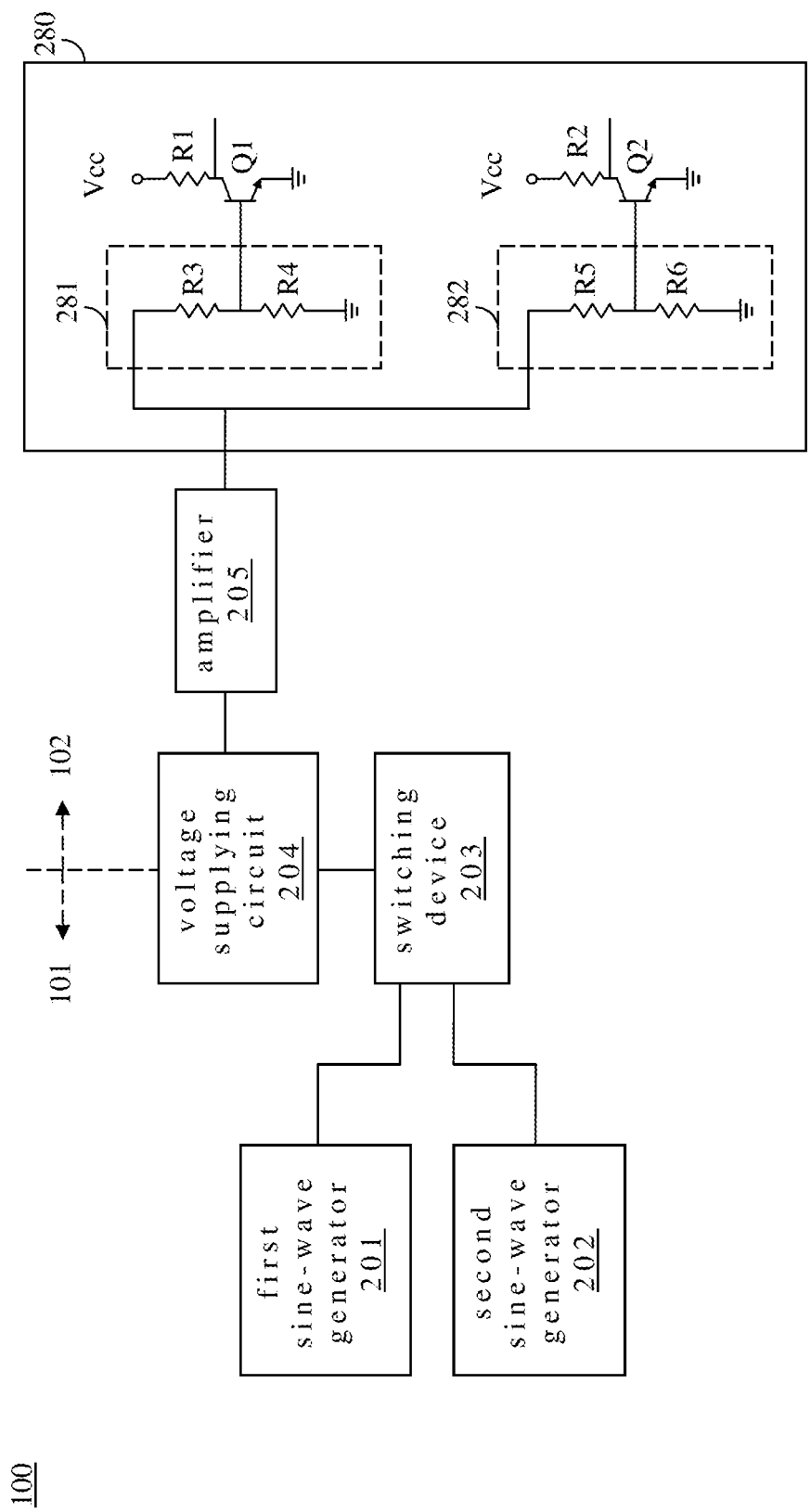
FIG. 2 is a partial circuit block diagram of the charging and data transmission system according to one embodiment of the present disclosure.

For a more complete understanding of the headset charging and data transmission system 100 using different phases, referring FIGS. 1-2, FIG. 2 is a partial circuit block diagram of the charging and data transmission system 100 according to one embodiment of the present disclosure.

Referring FIGS. 1-2, the first pulse-to-sine wave converter 160 includes a first sine-wave generator 201 and a second sine-wave generator 202. In use, the first sine-wave generator 201 is configured to receive a first pulse wave signal from the first controller 130 and to generate the first sine-wave signal based on the first pulse wave signal. The second sine-wave generator 202 is configured to receive a second pulse wave signal from the first controller 130 and to generate the second sine-wave signal based on the second pulse wave signal. The switching device 203 can be the first switching device 110 and/or the second switching device 120.

In FIG. 2, the charging device 101 can further include a voltage supplying circuit 204. In use, the voltage supplying circuit 204 provides the predetermined voltage, so that the predetermined voltage can be loaded with the first sine-wave data, so as to output the first sine wave data voltage.

In one embodiment of the present disclosure, a form of the first pulse wave signal is different from a form of the second pulse wave signal, so that a phase of the first sine-wave signal is different from a phase of the second sine-wave signal. Referring FIGS. 1-2, the second receiver 250 can further include an amplifier 205 and a phase detector 280. In structure, the phase detector 280 is electrically connected to the amplifier 205. In use, the amplifier 240 amplifies the first sine wave data voltage, and the phase detector 280 detects the phase of the amplified first sine wave data voltage, so as to provide the first digital signal associated with the first data.

In FIG. 2, the phase detector 280 includes a first voltage divider circuit 281, a first transistor Q1, a first resistor R1, a second voltage divider circuit 282, a second transistor Q2 and a second resistor R2. In structure, the first voltage divider circuit 281 is electrically connected to the output terminal of the amplifier 205. The base of the first transistor Q1 is electrically connected to the first voltage divider circuit 281. The first resistor R1 has one end electrically connected to a collector of the first transistor Q1, and another end electrically coupled with an operating voltage Vcc. The second voltage divider circuit 282 is electrically connected to the output terminal of the amplifier 205. The base of the second transistor Q2 is electrically connected to the second voltage divider circuit 282. The second resistor R2 has one end electrically connected to the collector of the second transistor Q2, and another end electrically coupled with the operating voltage Vcc.

In practice, a voltage drop ratio of the first voltage divider circuit 281 is different from a voltage drop ratio of the second voltage divider circuit 282. For example, the resistance value of the first resistor R1 is equal to the resistance value of the second resistor R2, the resistance value of the sixth resistor R6 is equal to the resistance value of the fourth resistor R4, and the resistance value of the fifth resistor R5 is less than the resistance value of the third resistor R3. Thus, when the output voltages of the collectors of the first and second transistors Q1 and Q2 both are in the logic low level, the digital signal represents logic "1". When the output voltage of the collector of the first transistor Q1 is in the logic low level and when the output voltage of the collector of the second transistor Q2 is in the logic high level, the digital signal represents logic "0".

In another embodiment of the present disclosure, the amplifier 205 and the phase detector 280 can be used in the first receiver 150, and the first sine-wave generator 201 and the second sine-wave generator 202 can be used in the second pulse-to-sine wave converter 260; accordingly, the switching device 203 can the third switching device 210 and/or the fourth switching device 220. The corresponding operations are similar to the above-mentioned embodiments, and thus, are not repeated herein.

Figure 3:
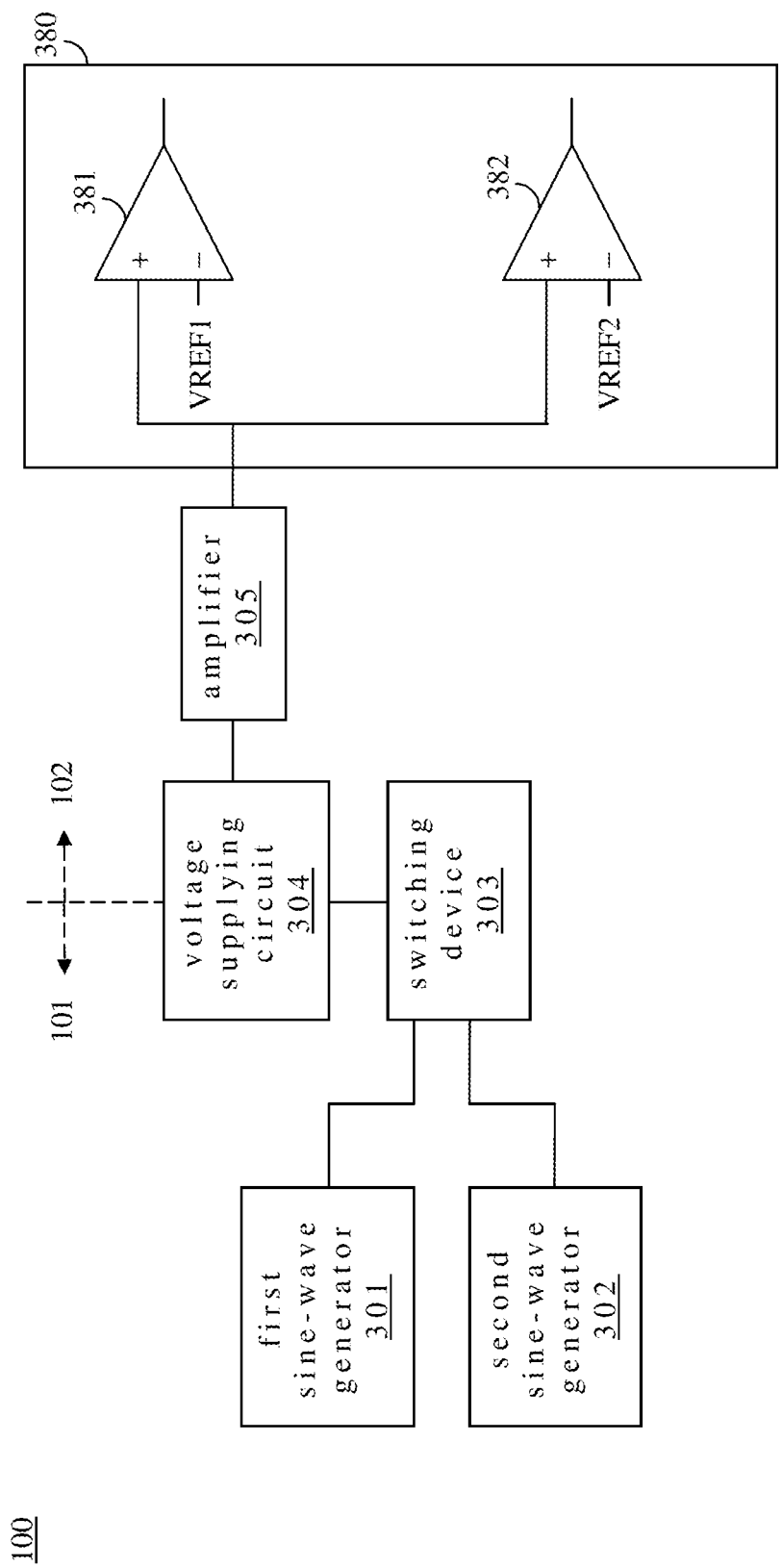
FIG. 3 is a partial circuit block diagram of the charging and data transmission system according to another embodiment of the present disclosure.

For a more complete understanding of the headset charging and data transmission system 100 using different amplitudes, referring FIGS. 1 and 3, FIG. 3 is a partial circuit block diagram of the charging and data transmission system 100 according to another embodiment of the present disclosure.

Referring FIGS. 1 and 3, the first pulse-to-sine wave converter 160 includes a first sine-wave generator 301 and a second sine-wave generator 302. In use, the first sine-wave generator 301 is configured to receive a first pulse wave signal from the first controller 130 and to generate the first sine-wave signal based on the first pulse wave signal. The second sine-wave generator 302 is configured to receive a second pulse wave signal from the first controller 130 and to generate the second sine-wave signal based on the second pulse wave signal. The switching device 303 can be the first switching device 110 and/or the second switching device 120.

In FIG. 3, the charging device 101 can further include a voltage supplying circuit 304. In use, the voltage supplying circuit 304 provides the predetermined voltage, so that the predetermined voltage can be loaded with the first sine-wave data, so as to output the first sine wave data voltage.

In one embodiment of the present disclosure, a height of the first pulse wave signal is different from a height of the second pulse wave signal, so that an amplitude of the first sine-wave signal is different from an amplitude of the second sine-wave signal. Referring FIGS. 1 and 3, the second receiver 250 can further include an amplifier 305 and an amplitude detection circuit 380. In structure, the amplitude detection circuit 280 is electrically connected to the amplifier 305. In use, the amplifier 305 amplifies the first sine wave data voltage, and the amplitude detection circuit 380 detects the amplitude of the amplified first sine wave data voltage, so as to provide the first digital signal associated with the first data.

In FIG. 3, the amplitude detection circuit 380 includes a first comparator 381 and a second comparator 382. In structure, the first comparator 381 has one input terminal electrically connected to an output terminal of the amplifier 305, and another input terminal electrically coupled with a first reference voltage VREF1. The second comparator 382 has one input terminal electrically connected to the output terminal of the amplifier 305, and another input terminal electrically coupled with a second reference voltage VREF2.

In practice, the first reference voltage is different from the second reference voltage. For example, the first reference voltage VREF1 is less than the second reference voltage VREF2. Thus, when the output voltages of the first and second comparator 381 and 382 both are in the logic high level, the digital signal represents logic "1". When the output voltage of the first comparator 381 is in the logic high level and when the output voltage of the second comparator 382 is in the logic low level, the digital signal represents logic "0".

In another embodiment of the present disclosure, the amplifier 305 and the phase detector 380 can be used in the first receiver 150, and the first sine-wave generator 301 and the second sine-wave generator 302 can be used in the second pulse-to-sine wave converter 260; accordingly, the switching device 303 can the third switching device 210 and/or the fourth switching device 220. The corresponding operations are similar to the above-mentioned embodiments, and thus, are not repeated herein.

Figure 4:
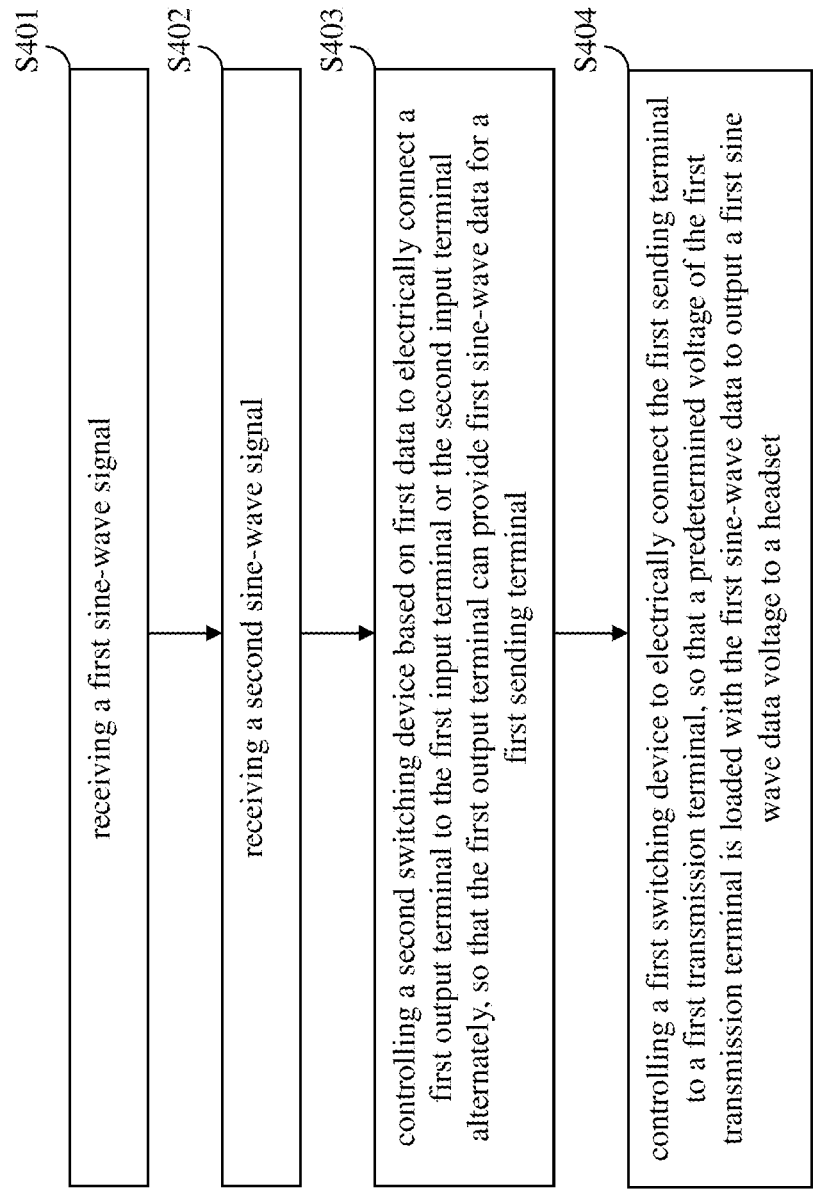
FIG. 4 is a flow chart of a charging and data transmission method according to one embodiment of the present disclosure.

For a more complete understanding of an operating method of the headset charging and data transmission system 100, referring FIGS. 1-4, FIG. 4 is a flow chart of a headset charging and data transmission method 400 according to one embodiment of the present disclosure. As shown in FIG. 4, the headset charging and data transmission method 400 includes operations S401-S404. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

In operation S401, the first sine-wave signal is received though the first input terminal 121. In operation S402, the second sine-wave signal is received though the second input terminal 122. In operation S403, the second switching device 120 is controlled based on the first data (e.g., instructions, exchange information, etc.) to electrically connect the first output terminal 125 to the first input terminal 121 or the second input terminal 122 alternately, so that the first output terminal 125 can provide the first sine-wave data for the first sending terminal 111. In operation S204, the first switching device 110 is controlled to electrically connect the first sending terminal 111 to the first transmission terminal 115, so that the predetermined voltage of the first transmission terminal 115 is loaded with the first sine-wave data to output the first sine wave data voltage to the headset 102. Thus, the charging device 101 charges the headset 102 and simultaneously transmits data during the charging process.

It should be noted that the functions performed by the implements in the headset charging and data transmission system 100 can be included in the operations of the headset charging and data transmission method 400. Since the above embodiments have specifically disclosed the functions of the implements, and thus, are not repeated herein.

In view of above, technical advantages are generally achieved, by embodiments of the present disclosure. With the technical solution of the present disclosure, the data transmission is realized on the power rail of the charging device 101 without additional data transmission lines and contacts, thereby effectively reducing the volume of the headset 102, and simultaneously transmitting data during the charging process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A headset charging and data transmission system, comprising:
 a headset; and
 a charging device, comprising:
  a first controller;
  a first connector configured to connect the headset;
  a first pulse-to-sine wave converter electrically connected to the first controller, and the first pulse-to-sine wave converter configured to provide a first sine-wave signal and a second sine-wave signal;
  a first switching device electrically connected to the first controller and the first connector, the first switching device having a first sending terminal, a first receiving terminal and a first transmission terminal, the first transmission terminal electrically connected to the first connector, and the first transmission terminal electrically connected to the first sending terminal or the first receiving terminal selectively; and
  a second switching device electrically connected to the first controller and the first switching device, the second switching device having a first input terminal, a second input terminal and a first output terminal, the first output terminal electrically connected to the first sending terminal, the first input terminal configured to receive the first sine-wave signal, the second input terminal configured to receive the second sine-wave signal, the first controller based on a first data to control the second switching device to electrically connect the first output terminal to the first input terminal or the second input terminal alternately, so that the first output terminal provides a first sine-wave data for the first sending terminal, and the first controller configured to control the first switching device to electrically connect the first sending terminal to the first transmission terminal, so that a predetermined voltage of the first transmission terminal is loaded with the first sine-wave data to output a first sine wave data voltage to the headset.

2. The headset charging and data transmission system of claim 1, wherein the first controller controls the first switching device electrically connects the first receiving terminal to the first transmission terminal, so that the first receiving terminal receives a second sine-wave data voltage that is sent from the headset to the first connector, wherein the charging device further comprises:
 a first receiver electrically connected to the first receiving terminal and the first controller, and the first receiver configured to convert the second sine-wave data voltage into a second digital signal associated with the second data and to output the second digital signal to the first controller.

3. The headset charging and data transmission system of claim 2, wherein the headset comprises:
 a second controller;
 a second connector configured to connect the first connector;
 a second pulse-to-sine wave converter electrically connected to the second controller, and the second pulse-to-sine wave converter configured to provide a third sine-wave signal and a fourth sine-wave signal;
 a third switching device electrically connected to the second controller and the second connector, the third switching device having a second sending terminal, a second receiving terminal and a second transmission terminal, and the second transmission terminal electrically connected to the second connector; and
 a fourth switching device electrically connected to the second controller and the third switching device, the fourth switching device having a third input terminal, a fourth input terminal and a second output terminal, the second output terminal electrically connected to the second sending terminal, the third input terminal configured to receive the third sine-wave signal, the fourth input terminal configured to receive the second sine-wave signal, the second controller based on a second data to control the fourth switching device to electrically connect the second output terminal to the third input terminal or the fourth input terminal alternately, so that the second output terminal provides a second sine-wave data for the second sending terminal, and the second controller configured to control the third switching device to electrically connect the second sending terminal to the second transmission terminal, so that the second sine-wave data are outputted to the charging device.

4. The headset charging and data transmission system of claim 3, wherein the second controller controls the third switching device to electrically connect the second receiving terminal to the second transmission terminal, so that the second receiving terminal receives the first sine-wave data that are sent from the charging device to the second connector, wherein the headset further comprises:
   a second receiver electrically connected to the second receiving terminal and the second controller, and the second receiver configured to convert the first sine-wave data into a first digital signal associated with the first data and to output the first digital signal to the second controller.

5. The headset charging and data transmission system of claim 4, wherein the first pulse-to-sine wave converter comprises:
   a first sine-wave generator configured to receive a first pulse wave signal from the first controller and to generate the first sine-wave signal based on the first pulse wave signal; and
   a second sine-wave generator configured to receive a second pulse wave signal from the first controller and to generate the second sine-wave signal based on the second pulse wave signal.

6. The headset charging and data transmission system of claim 5, wherein the charging device further comprises:
   a voltage supplying circuit configured to provide the predetermined voltage, so that the predetermined voltage is loaded with the first sine-wave data, so as to output the first sine wave data voltage.

7. The headset charging and data transmission system of claim 6, wherein a form of the first pulse wave signal is different from a form of the second pulse wave signal, so that a phase of the first sine-wave signal is different from a phase of the second sine-wave signal, and the second receiver further comprises:
   an amplifier configured to amplify the first sine wave data voltage; and
   a phase detector electrically connected to the amplifier, and the phase detector configured to detect the phase of the first sine wave data voltage that has been amplified, so as to provide the first digital signal associated with the first data.

8. The headset charging and data transmission system of claim 7, wherein the phase detector comprises:
   a first voltage divider circuit electrically connected to an output terminal of the amplifier;
   a first transistor having a base electrically connected to the first voltage divider circuit;
   a first resistor having one end electrically connected to a collector of the first transistor, and another end electrically coupled with an operating voltage;
   a second voltage divider circuit electrically connected to the output terminal of the amplifier;
   a second transistor having a base electrically connected to the second voltage divider circuit; and
   a second resistor having one end electrically connected to the collector of the second transistor, and another end electrically coupled with the operating voltage,
   wherein a voltage drop ratio of the first voltage divider circuit is different from a voltage drop ratio of the second voltage divider circuit.

9. The headset charging and data transmission system of claim 6, wherein a height of the first pulse wave signal is different from a height of the second pulse wave signal, so that an amplitude of the first sine-wave signal is different from an amplitude of the second sine-wave signal, and the second receiver further comprises:
   an amplifier configured to amplify the first sine wave data voltage; and
   an amplitude detection circuit electrically connected to the amplifier, the amplitude detection circuit configured to detect the amplitude of the first sine wave data voltage that has been amplified, so as to provide the first digital signal associated with the first data.

10. The headset charging and data transmission system of claim 9, wherein the amplitude detection circuit comprises:
   a first comparator having one input terminal electrically connected to an output terminal of the amplifier, and another input terminal electrically coupled with a first reference voltage; and
   a second comparator having one input terminal electrically connected to the output terminal of the amplifier, and another input terminal electrically coupled with a second reference voltage,
   wherein the first reference voltage is different from the second reference voltage.

* * * * *